United States Patent [19]
Laurent et al.

[11] 3,834,564

[45] Sept. 10, 1974

[54] CONTROL DEVICE FOR THE COMBINED OPERATION OF AN UNLOADER TUBE AND AUGER CLUTCH OF A COMBINE HARVESTER

[75] Inventors: Michel A. Laurent, Villeneuve D'Ascq; Jean M. Lemoine, Wasquehal; Georges L. Godderis, Croix, all of France

[73] Assignee: International Harvester Company, Chicago, Ill.

[22] Filed: Oct. 23, 1973

[21] Appl. No.: 408,337

[52] U.S. Cl.............................. 214/83.26, 198/72
[51] Int. Cl............................................ B60p 1/42
[58] Field of Search............ 214/83.26, 83.14, 83.1, 214/83.32; 198/72, 73, 74, 113

[56] References Cited
UNITED STATES PATENTS
2,616,579   11/1952   Kill................................. 214/83.26

*Primary Examiner*—Allen N. Knowles
*Assistant Examiner*—Hadd S. Lane
*Attorney, Agent, or Firm*—F. David Aubuchon; Floyd B. Harman

[57] ABSTRACT

A control system for the grain auger and discharge tube of a combine harvester. A single handle may be displaced from a central, neutral position to set the tube to a transport position, or to a work position, and from said work position only to an auger actuating position.

9 Claims, 11 Drawing Figures

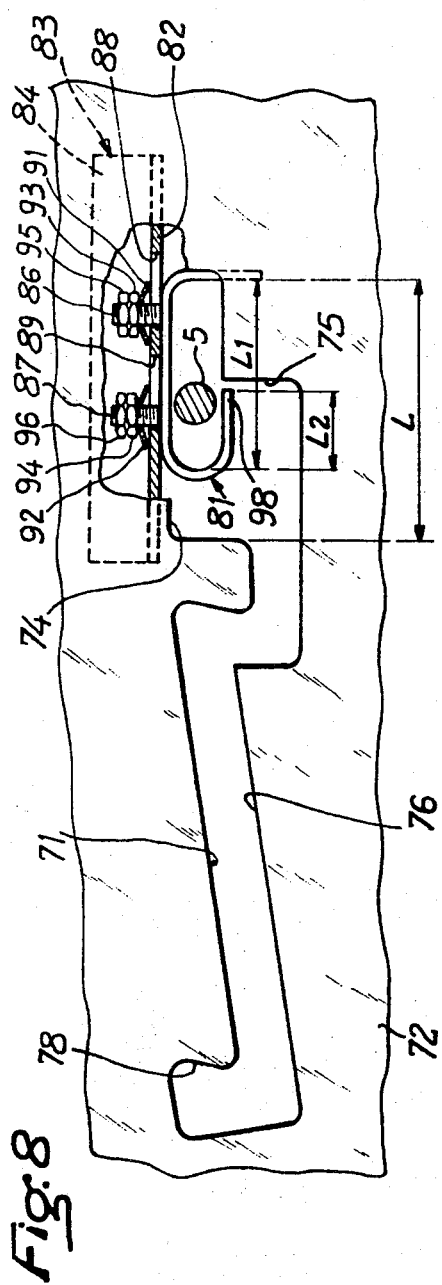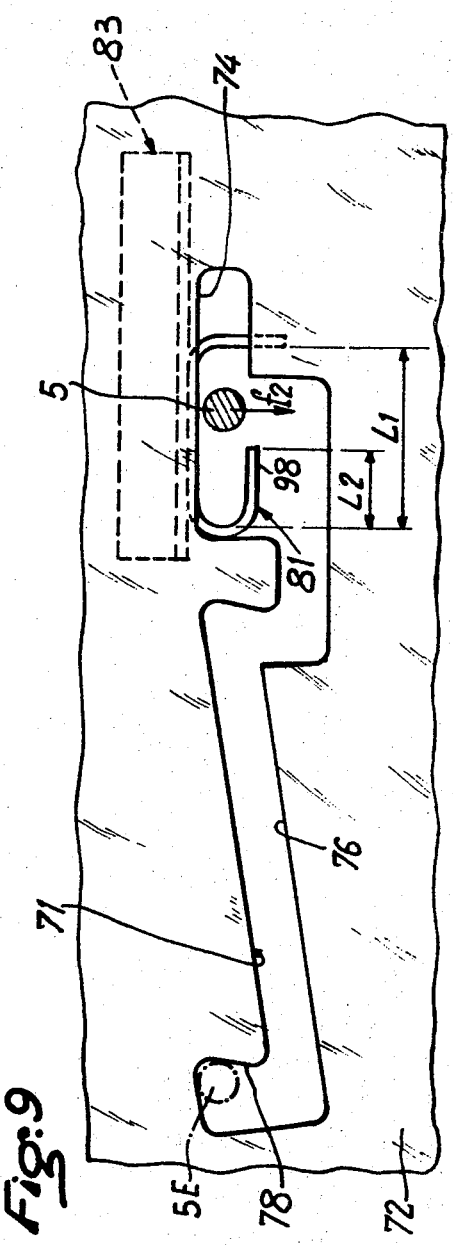

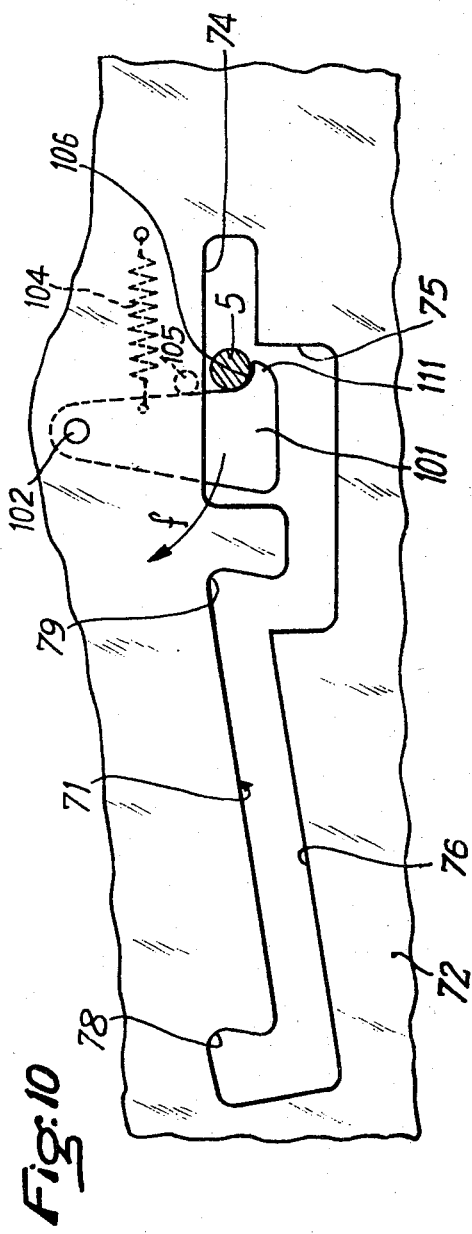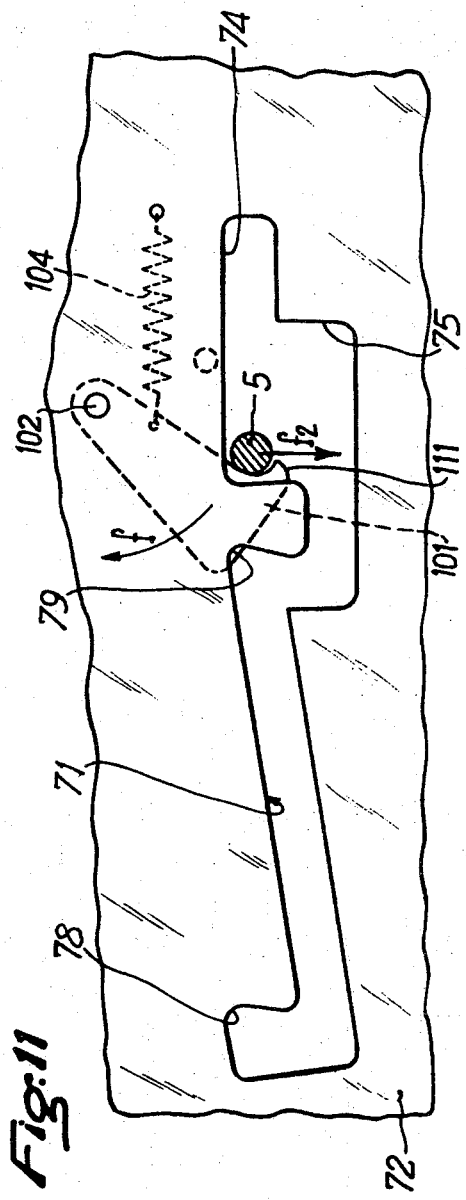

CONTROL DEVICE FOR THE COMBINED OPERATION OF AN UNLOADER TUBE AND AUGER CLUTCH OF A COMBINE HARVESTER

This invention is concerned with the control system for the operation of the grain-discharge tube or so-called unloader tube of a combine-harvester in order to transfer the tube from its folded-back or road transport position to its raised work position and conversely, and also with the clutch-control system for initiating the operation of the auger which is intended to discharge the grain into the unloader tube in the work position.

Up to the present time, these two systems were controlled by two separate units. The aim of the invention is to provide a control device having a single manual-control member which serves to initiate the displacements of the unloader tube and the operation of the auger clutch under conditions of safety which are such that the auger clutch can be engaged only on condition that the tube is in the work position and that said tube can be returned to the road position only if the auger clutch is released.

To this end, the control device in accordance with the invention essentially comprises: a single movable manual-control member which can be displaced on the one hand from a neutral position selectively to a road transport position or to a work position in order to initiate setting of the unloader tube in the transport position or the work position respectively and, on the other hand, to a clutch-engagement position in which said unloader tube must be maintained as long as the clutch is intended to remain engaged, said single movable manual-control member being coupled to the system for controlling the displacements of the unloader tube and to the auger-actuating clutch control system respectively by connecting means so arranged that, when the manual-control member is moved between its neutral position and its two positions of road transport and work, said member does not produce action on the auger-actuating clutch control system and that said member can move towards its clutch-engagement position only when it has first passed through its work position.

By virtue of this device, when the manual-control member is displaced in the first portion of its travel, the unloader tube can be moved at will either to the road position or to the work position but the auger which feeds said tube can be set in motion only if this latter has previously been brought into the work position. Conversely, the unloader tube cannot be brought into the road position without having first disengaged the drive mechanism of the auger.

The invention is also directed to the combine harvesters which are equipped with the single control device aforesaid for the combined operation of the unloader tube and the clutch of the auger which feeds said tube.

A better understanding of the invention will be gained from a perusal of the following description and from a study of the accompanying drawings in which two embodiments of a device according to the invention are shown by way of example without any limitation being implied, and in which:

FIG. 8 is a plan view to a larger scale with portions broken away and showing the control device in the neutral position as can be seen in FIG. 2 and also showing a guide plate fitted with a locking member;

FIG. 9 is a view which is similar to FIG. 8 but in which the device is shown in the position corresponding to the active position of the unloader tube;

FIG. 10 is a plan view of an alternative construction of the control device in the neutral position and of the guide plate with an alternative construction of the locking member;

FIG. 11 shows the same alternative construction in the position of putting into service of the unloader tube.

Figure 1:
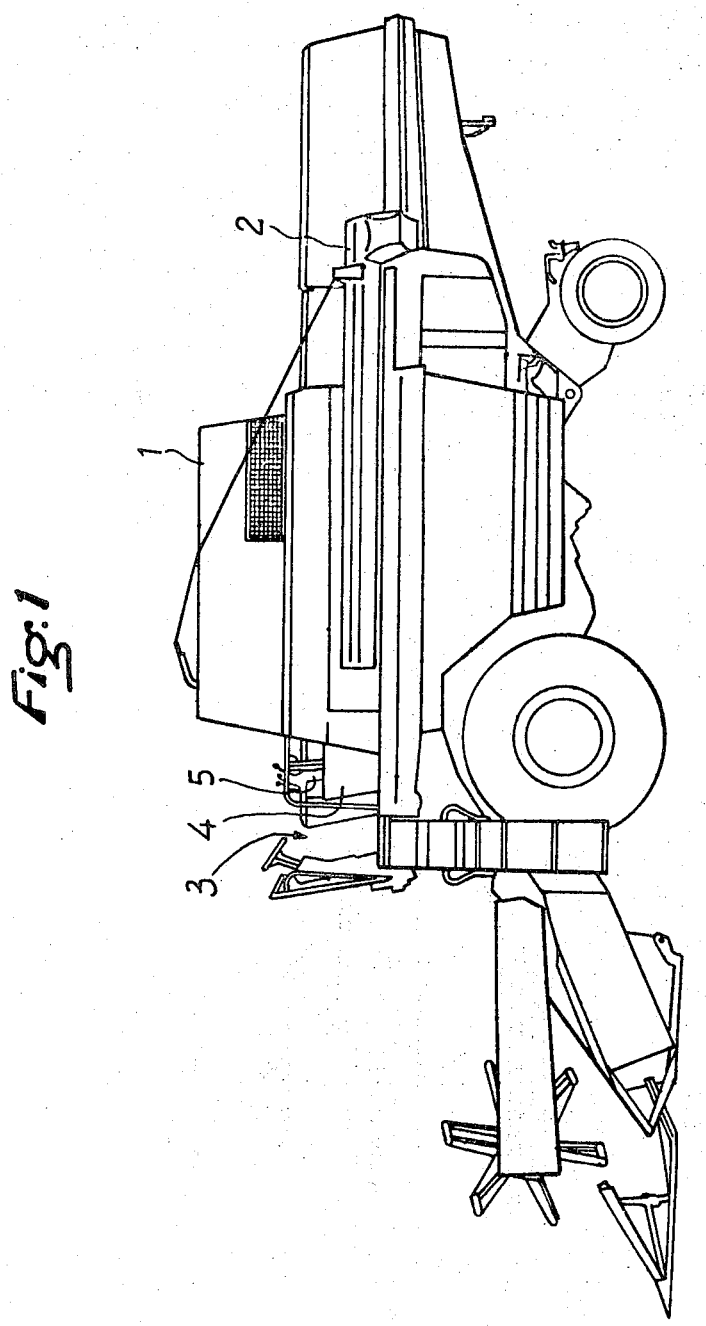
FIG. 1 is a profile view of a combine-harvester equipped with a control device in accordance with the invention, it being assumed that the grain-discharge or unloader tube has been brought back into its road position.
Figure 2:
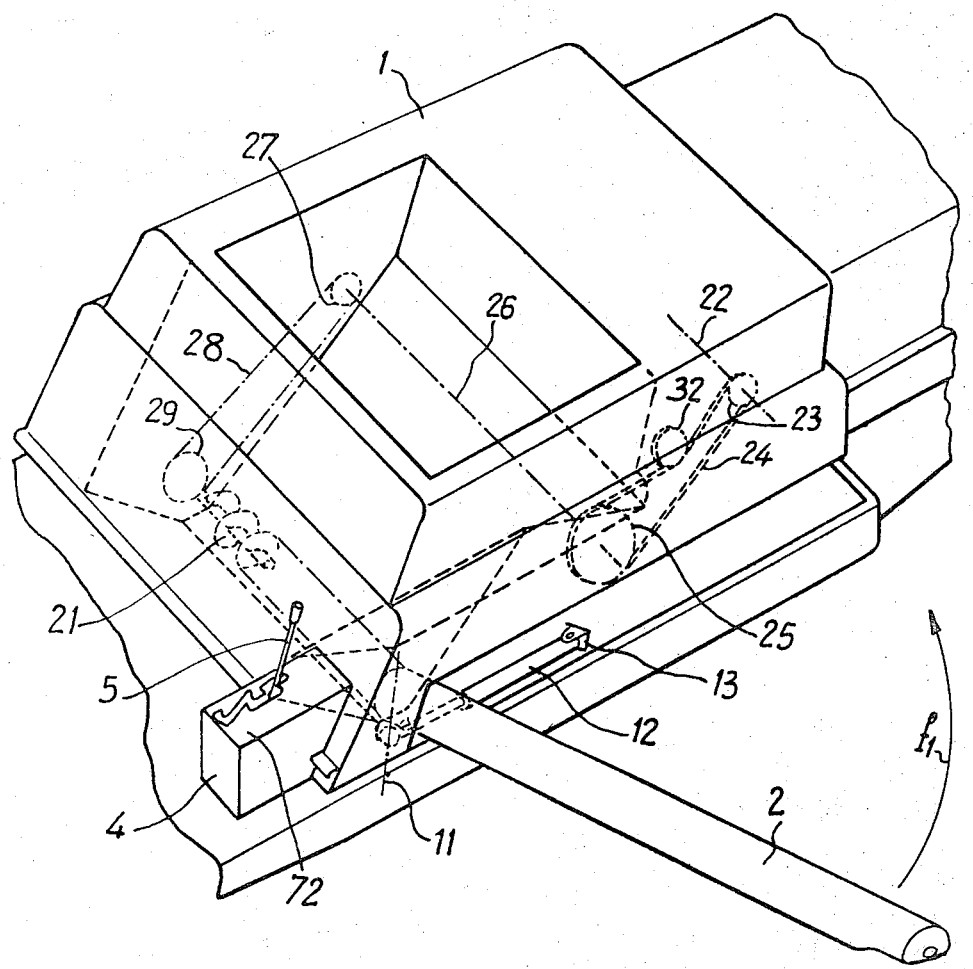
FIG. 2 is a diagrammatic view in perspective and to a larger scale showing the upper portion of the machine together with the unloader tube in the work position, the auger and operating mechanism, as well as the single control device for the operation both of the unloader tube and of the auger-control clutch.

The combine-harvester which is illustrated in the general profile view of FIG. 1 mainly comprises a grain tank 1, an unloader tube 2 which is shown folded in the road or transport position and, on a platform 6, an operator's deck generally designated by the reference 3 and mainly comprising a casing 4 equipped with a hand lever 5 (as also shown in FIG. 2) which serves to produce action on the control device according to the present Application.

The grain-discharge or unloader tube 2 can be moved from the road position shown in FIG. 1 in which the tube is folded-back alongside the machine to the work position shown in FIG. 2 in which said tube is upwardly and outwardly inclined, in a pivotal movement about an upwardly and inwardly inclined geometrical axis designated by the reference 11, under the action of any suitable control system as shown diagrammatically in FIG. 2 and constituted by a hydraulic jack 12, one extremity of which is pivotally attached to a support bracket 13 carried by the framework of the machine and the other extremity of which is pivotally mounted on the base of the unloader tube 2 in the vicinity of the tube hinge.

The hydraulic jack 12 is supplied with oil under pressure by means of a distributor 16 (as shown in FIGS. 4 to 7). The control element of said distributor is a pin 17 which is pivoted about an axis 18 and thus permitted to occupy either the neutral position shown at 17 or the tube-lifting position shown at 17R (FIG. 4) or the tube-lowering position shown at 17D.

The grain contained in the tank 1 of the machine can be discharged into the unloader tube 2 by means of a transverse auger 21 (shown in FIG. 2) which is driven from a shaft 22 by means of a transmission system comprising a pulley 23 fixed on the shaft 22, a driving belt 24 which passes over said pulley and over another pulley 25 carried by an intermediate shaft 26, a pulley 27 fixed on the shaft 26 and a driving belt 28 which passes over the pulley 27 and over another pulley 29 fixed on the shaft of the auger 21. The driving belt 24 can be either slack or tensioned by a movable roller 36 which constitutes a clutch element for the auger 21.

Figure 3:
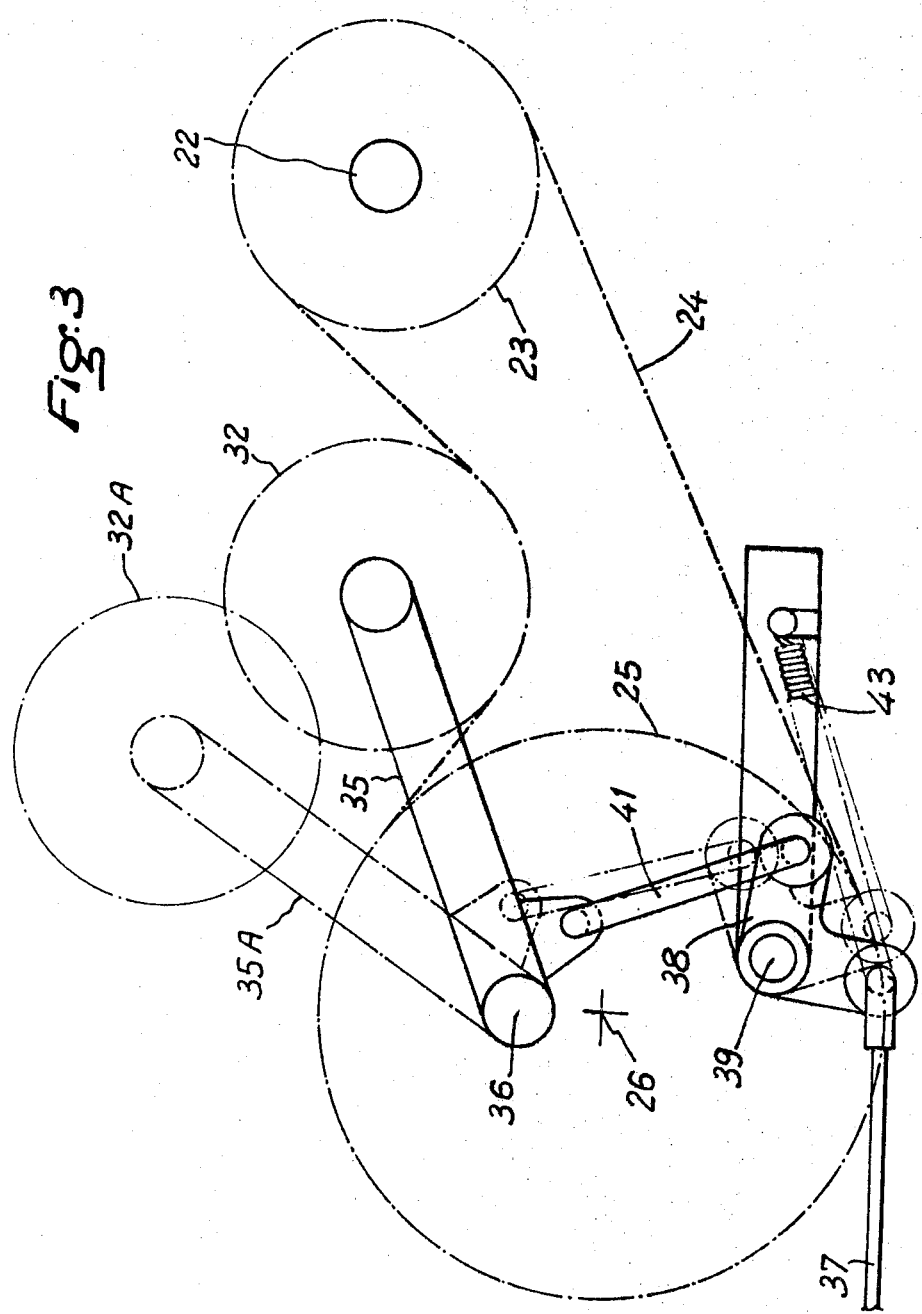
FIG. 3 is a view to a larger scale showing details of the system for the engagement of the auger drive mechanism.

FIG. 3 shows the detail of said clutch to a larger scale. The tension-roller 32 is freely mounted on the end of a movable arm 35 which is capable of pivoting on a pin 36 under the action of a clutch control cable 37 by means of a mechanism comprising a bell-crank lever 38 pivotally mounted on a stationary pin 39 and a connecting-rod 41. A restoring spring 43 tends to cause the bell-crank lever 38 to pivot in the direction which moves the tension-roller 32 away from the driving belt 24 towards the position shown in chain-dotted lines at 32A. When a tractive effort is exerted on the cable 37 in opposition to the spring 43, the tension-roller 32 is applied against the driving belt 24, with the result that said belt is tensioned and that the auger 21 is driven in rotation from the shaft 22 by means of the transmission system hereinabove described.

Figure 4:
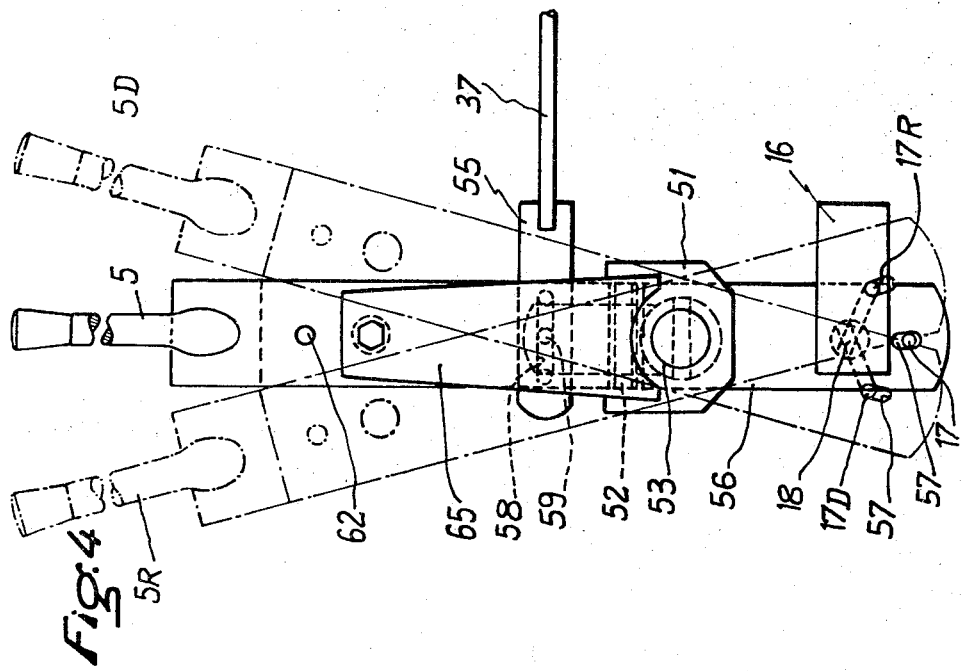
FIG. 4 is a profile view to a larger scale showing the control device in three different positions.
Figure 5:
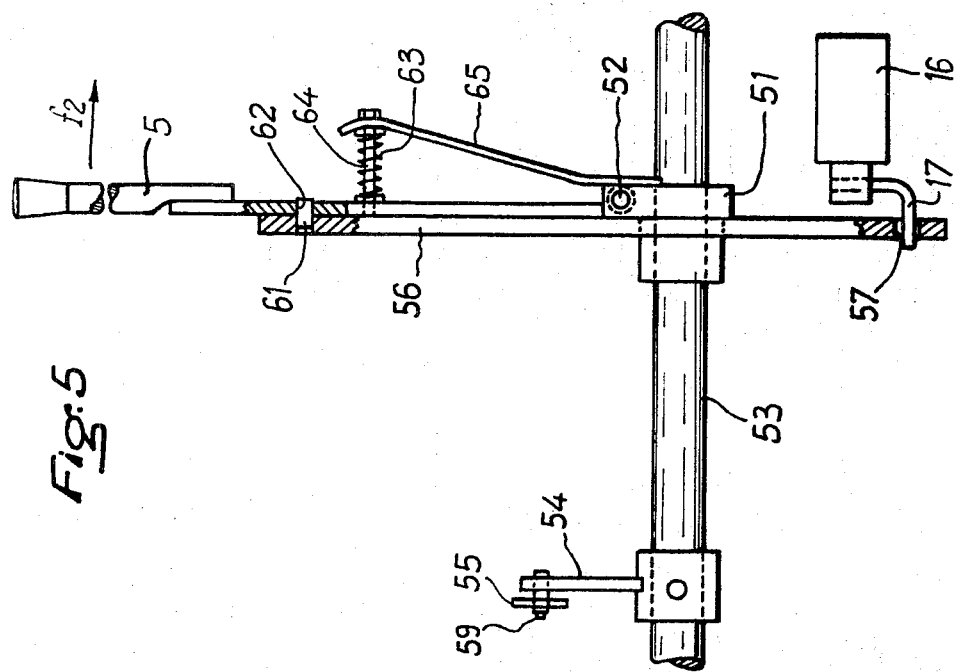
FIG. 5 is a profile view with portions broken away and corresponding to FIG. 4.
Figure 6:
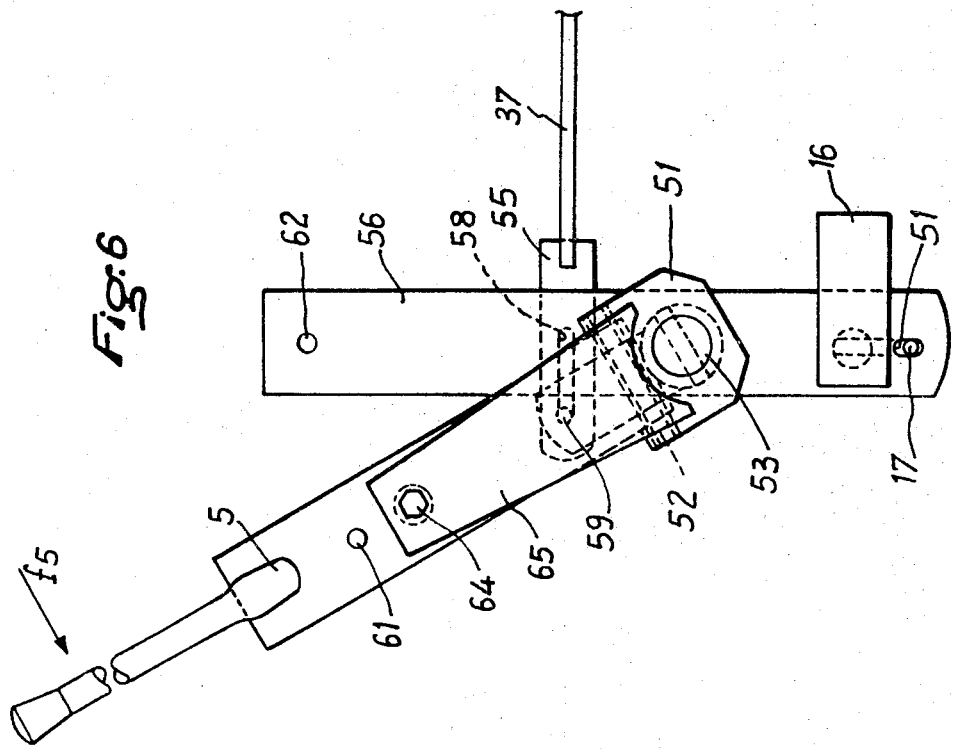
FIG. 6 is a view which is similar to FIG. 4 and shows the hand lever in the auger-engagement position.
Figure 7:
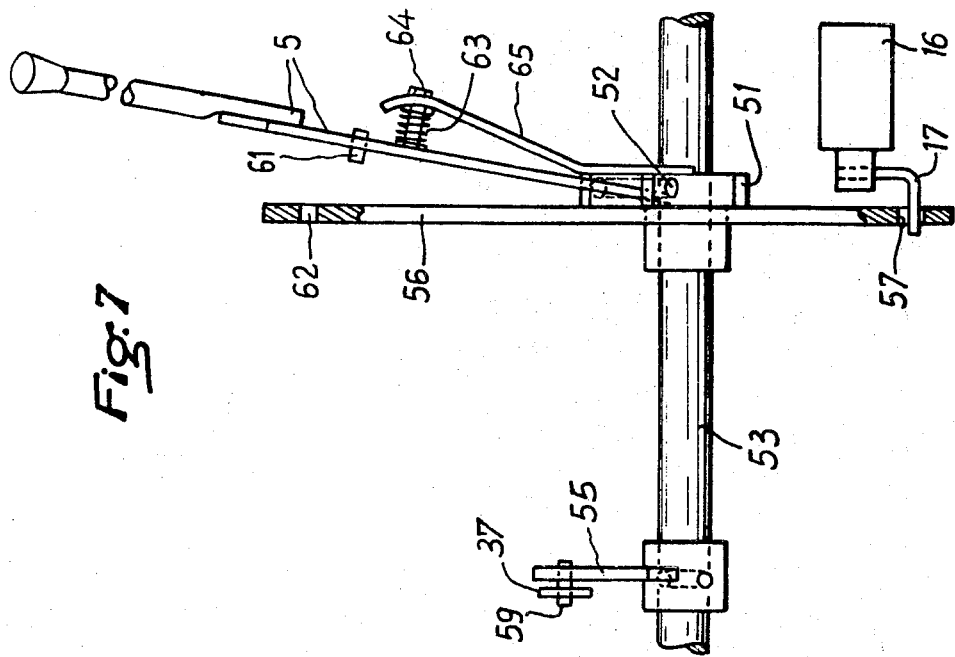
FIG. 7 is a profile view with portions broken away and corresponding to FIG. 6.

The control of the distributor 16 which supplies the jack 12 for initiating the displacements of the unloader tube and the tractive effort applied to the clutch control cable 37 of the auger 21 are ensured by means of the device which is controlled by the single hand lever 5. The lever 5 is mounted on a hub 51 (as shown in FIGS. 4 and 5) for pivotal motion about a pin 52 located at right angles to the axis of the hub. Said hub is rigidly fixed to a shaft 53 which carries an arm 54, the other extremity of the clutch control cable 37 being attached to said arm by means of a slide plate 55 having a slot 58 in which is slidably engaged a stud 59 fixed on the extremity of the arm 54 (see also FIG. 6), thereby forming a dead travel connection between the hand lever 5 and the cable 37. The shaft 53 is rotatably mounted in two bearings 50 which are fixed on the platform 6 of the operator's deck.

On the shaft 53 and against the hand lever 5, there is freely mounted for pivotal motion an intermediate lever 56 having an extension pierced by a hole 57 in which is fitted the bent-back extremity of the pin 17 for actuating the hydraulic distributor 16.

The hand lever 5 can be temporarily coupled to the intermediate lever 56 by means of any suitable system such as, for example, a lug 61 which is rigidly fixed to one of said two levers and is capable of engaging in a hole 62 of the other lever under the action of a spring 63 passed over a rod 64 which is rigidly fixed to the hand lever 5 and interposed between said lever and a rigid plate 65, said plate being attached to the hub 51 which carries the hand lever. When said lever is displaced in the direction of the arrow f2 (as shown in FIG. 5), said lever is caused to pivot about the pin 52 and disengaged from the lug 61 which is attached to the intermediate lever 56, with the result that the hand lever 5 can be rotated on the shaft 53 without displacing the intermediate lever 56.

The hand lever 5 extends through a slot 71 in guide plate 72 (shown in FIGS. 8 and 9) which is cut in the top wall 72 of the casing 4 (as shown in FIGS. 1 and 2).

The guide plate slot 71 has a first section 74 along which the hand lever 5 can be displaced by causing this latter to pivot with the shaft 53 (see FIGS. 4 and 5), a second section 75 which is directed at right angles to the first section and along which the hand lever 5 can be displaced in a pivotal movement about the pin 52 of its hub, that is to say in the direction of the arrow f2 (as shown in FIGS. 5 and 9), and a third section 76 having a general direction located approximately in the line of extension of the first section 74 and provided with a recess 78 for retaining the lever in the position of engagement of the clutch 32 of the auger-driving belt and an intermediate lever-positioning recess 79 for releasing the clutch.

The guide plate 71 is fitted with a locking member designated by the general reference 81 and constituted by a retaining-plate which is capable of sliding in the direction of the first section 74 of the guide plate against a vertical flange 82 of an L-section member 83, the other flange 84 of which is fixed in a flat position against the underface of the top wall of the casing 72. The retaining plate 81 carries two threaded studs 86, 87 which pass respectively through two elongated slots 88, 89 formed in the vertical flange 82 of the L-section member in such manner as to guide said locking member. Two resilient washers 91, 92 fitted respectively on the two studs 86, 87 are clamped with moderate force against the underface of the flange 82 of the L-section member by means of nuts 93, 94 fitted with lock-nuts 95, 96. The locking member 81 can be displaced in opposition to the friction set up by the two resilient washers 91, 92 but remains in the position in which it is left.

The two extremities of the plate 81 which constitutes the locking member are bent back in the direction of the second section 75 of the guide plate and spaced apart at a distance 11, namely approximately three-quarters of the length of the first section 74 of the guide plate which corresponds to angular displacements of the hand lever 5 for the control of the distributor 16 (FIG. 4). The curved extremity of the retaining-plate 81 is located on the same side as the neutral position of the manual-control member which corresponds to the setting of the unloader tube in the work position; said curved extremity has a return portion 98 which is parallel to the direction of the first section 74 of the guide plate and has a length L2 which is substantially equal to one-quarter of the length of said section 74 of the guide plate.

The operation of the complete assembly is as follows:

It will first be assumed that the unloader tube 2 is in the position of rest or road position alongside the machine as shown in FIG. 1. It can be understood that the tube has been placed in this position as a result of a supply of fluid to the jack 12 which corresponds to the position 17D (FIG. 4) of the distributor 16 and that, in consequence, the hand lever 5 itself had already been brought into the position 5D, that is to say in the right-hand portion (shown in FIG. 8) of the first section 74 of the guide plate 71 and that said lever had then been brought into the neutral position as shown in FIG. 8. The locking member 81 had therefore been displaced to the end of travel on the right-hand side as shown in the figure.

In order to lift the unloader tube into the work position shown in FIG. 2, the jack 12 is supplied in the other direction; to this end, the pin 17 of the distributor 16 is brought into the position 17R (shown in FIG. 4)

by causing the hand lever 5 to pivot until it reaches the position 5R, that is to say in the first portion of its travel. This movement therefore thrusts the locking member 81 towards the left in FIG. 8 and causes said member to take up the position shown in FIG. 9. It will be noted that the amplitude of this pivotal movement of the hand lever is not sufficient to apply tension to the clutch control cable 37, especially by reason of the dead travel in the connection provided by the stud 59 within the slot 58 of the slide plate 55 (shown in FIGS. 4 and 6).

As soon as the unloader tube 2 has reached its work position, the hand lever 5 is brought back to the neutral position as shown in full lines in FIG. 9. The locking member 81 has therefore freed the space of the guide plate which is located along section 75 of this latter, which the result that the lever 5 can now be shifted into said space in the direction of the arrow f2 (see also FIG. 5) and that said lever takes up the position shown in FIG. 7. The lever is then displaced in pivotal motion as indicated by the arrow f5 in FIG. 6 or, in other words, is displaced within the second section or portion of travel, thereby applying tension to the clutch control cable 37 for starting-up the auger 21. The hand lever is locked at 5E within the recess 78 (FIG. 9) of the guide plate 71 and maintained within said recess by the tension of the cable 37 under the action of the spring 43 (as shown in FIG. 3). The grain delivered by the auger therefore passes from the grain tank 1 into the unloader tube 2.

In order to stop the auger, it is only necessary to shift the hand lever 5 from the position 5E (shown in FIG. 9) to the position 5F, this being an intermediate position in which the hand lever is maintained engaged and in which the driving belt 24 is released. This intermediate position offers convenient use by reason of the fact that, in practice, the unloader tube 2 is left in the work position when the machine is in operation.

In order to return the unloader tube 2 to the position of rest, it is only necessary to shift the hand lever 5 from position 5E or position 5F (FIG. 9) to the neutral position 5 in which said lever engages once again in the intermediate lever 56 which controls the distributor 16, then to pull said lever back to position 5D (shown in FIG. 4), which also returns the locking member 81 into the position shown in FIG. 8 as has already been explained earlier. When the tube has reached the horizontal position of rest, the lever 5 is returned to the neutral position shown in full lines in FIG. 8. An entire cycle of operation of the device as a whole has thus been completed and all the components have reverted to their initial positions.

It will be noted that, in this position, the hand lever 5 cannot be shifted to its position of engagement of the auger within the recess 78 of the guide plate since the return portion 98 of the locking member 81 prevents the lever 5 from passing into the second section 75 of the guide plate. This can be carried out only after the locking member 81 has been shifted into the position shown in FIG. 9, from which it can consequently be postulated that the unloader tube has previously been brought into the top position, or work position.

Conversely, when the machine is in operation and the auger is consequently engaged, that is to say when the hand lever occupies position 5E (FIG. 9), the unloader tube cannot be lowered again by reason of the fact that, before the lever 5 can be brought into the corresponding section 74 of the guide plate, it is first necessary to move the lever along the section 76, then through the section 75 up to the neutral position of FIG. 9.

When the combine is in operation, it will therefore be necessary at the outset to effect the disengagement of the auger and it will be noted that the hand lever 5 thus re-engages with the intermediate lever 56 which has remained in the neutral position since the return portion 98 of the locking member has the effect of restoring the hand lever to the neutral angular position in order that said lever should be permitted to come back to the first section 74 of the guide plate.

The releasable coupling between the hand lever 5 and the intermediate lever 56 could be constituted by means other than a lug engaged within a hole. Such means could consist, for example, of two lateral arms provided on one of the levers and adapted to embrace the other lever or, in a more general manner, of cooperating elements carried by said levers and having a small axial length.

FIGS. 10 and 11 illustrate an alternative form of construction of the control device; there are again shown in these figures the hand lever 5 and the plate 71 in which said lever is guided during its displacements. The system for locking the lever 5 is different and constituted by a catch 101 pivotally mounted on a vertical pin 102 which is secured to the top wall of the casing 72 so that said catch should be capable of pivoting against the bottom face of the guide plate. Said catch is subjected to the action of a spring 104 and is intended to be returned by this latter against a fixed stop 105 which is also attached to the wall 72.

The catch 101 has a hook-shaped portion 106 against which the lever 5 is applied in the neutral position, the catch being in contact with the stop 105 as shown in FIG. 10. The shape of said hook-shaped portion 106 is such that, when the catch 101 has pivoted in the direction of the arrow $f$ (see also FIG. 11) and when the lever 5 has reached the position shown in FIG. 11 in which the unloader tube is placed in the work position, said portion 106 enables the lever 5 to move in the direction of the arrow f2 while slightly displacing the catch 101 to a further extent in opposition to its restoring spring 104.

The catch 101 is additionally provided with a portion 111 in the form of a cam so designed that, when the catch is applied against the stop 105, the hand lever 5 is permitted, when returning in the opposite direction along the second path defined by the section 75 of the guide plate and in order to revert to its neutral position as shown in FIG. 10, to thrust back the catch 101 to a slight extent in opposition to its restoring spring 104.

The operation is similar to that shown in FIGS. 8 and 9; when the hand lever 5 is in the neutral position shown in FIG. 10, said lever cannot be shifted into the section 75 of the guide plate in order to prepare the clutch-engagement operation without first having brought said lever into the work position of the unloader tube as shown in FIG. 11 since it is only in the position just mentioned that the hook-shaped portion 106 of the catch permits disengagement of the lever 5 from this latter. During its return movement, the lever 5 is readily restored to its neutral position of FIG. 10 by thrusting back the cam portion 111 of said catch to a slight extent.

As will be readily understood, the invention is not limited to the embodiment hereinabove described with

We claim:

1. A control device for systems which initiate movements of the grain-unloading tube of a combine-harvester in order to transfer the tube from its folded-back or road transport position to its raised work position and conversely, and for the clutch-control system for initiating the operation of the auger which is intended to discharge the grain into said unloader tube in the work position alone, said control device being characterized in that it comprises a single movable manual-control member which can be displaced on the one hand from a neutral position selectively to a road transport position or to a work position in order to initiate setting of the unloader tube in the transport position or the work position respectively and, on the other hand, to a clutch-engagement position in which said unloader tube must be maintained so long as said clutch is intended to remain engaged, said single movable manual-control member being coupled to the system for controlling the displacements of the unloader tube and to the auger-actuating clutch control system respectively by connecting means so arranged that, when the manual control member is moved between its neutral position and its two positions of road transport and work, said member does not produce action on the auger-actuating clutch control system and that said member can move towards the clutch-engagement position thereof only when it has first passed through its work position.

2. A device according to claim 1, characterized in that the single movable manual-control member is coupled to the auger-actuating clutch control system by means of a dead-travel connection in which the dead travel corresponds to the range of motion of said movable control member between its neutral position and its two positions of road transport and work, said movable member being connected to the system for controlling the displacements of the unloader tube by means of a releasable coupling controlled by said movable member and subjected to the action of a locking device designed and arranged to permit only the sequences aforesaid.

3. A device according to claim 2, characterized in that the single movable manual-control member is capable of moving in both directions along a first predetermined path between its neutral position and its two positions of road transport and work, the releasable coupling being freed by means of a displacement of said single movable manual-control member along a second path at right angles to the first path aforesaid.

4. A device according to claim 3, characterized in that the single movable manual-control member is a lever and the locking system is constituted by a retaining-plate which is capable of sliding along the aforesaid first path of travel of said movable member, the extremities of said retaining-plate being bent back in the direction of the second path aforesaid and spaced apart at a distance corresponding to approximately three-quarters of the length of travel of the movable member between the road and work positions thereof, the curved extremity of the retaining-plate being located on the same side as the neutral position of said movable member which corresponds to the setting of the unloader tube in the work position, said curved extremity being provided with a return portion which is parallel to the direction of sliding motion of said retaining-plate and has a length substantially equal to one-quarter of the aforesaid length of travel of said movable member.

5. A device according to claim 4, characterized in that the sliding retaining-plate is fitted with a friction system against the member which carries said plate.

6. A device according to claim 3, characterized in that the coupling between the single movable manual-control member and the system for controlling the displacements of the unloader tube comprises a lever rigidly fixed to a pivotal shaft coupled to the clutch-control system and the single movable manual-control member is also constituted by a lever carried by a hub which is freely mounted on the same shaft and also capable of pivoting with respect to said shaft about a second axis at right angles thereto, the releasable coupling aforesaid being constituted by cooperating elements of short axial length carried by said levers such as a lug carried by one of said two levers and capable of engaging in a corresponding hole of the other lever under the action of a pivotal movement of said single movable manual-control member about the second axis aforesaid.

7. A device according to claim 6, characterized in that the manual control lever is engaged in a guide plate having a first section for guiding the lever between its neutral position and its two positions of road transport and work, a second section having a direction at right angles to the direction of the first section for guiding the lever during the movements involved in connecting and disconnecting the releasable coupling aforesaid, and a third section located approximately in the line of extension of the first section for guiding said lever during the movements involved in the engagement and release of the auger-control clutch.

8. A device according to claim 7, characterized in that the third section of the plate for guiding the manual control lever has a recess for retaining said lever in the position of engagement of the auger-control clutch and a recess for retaining said lever in the position of release of said clutch.

9. A device according to claim 3, characterized in that the single movable manual-control member is a lever and the locking system is constituted by a catch which is pivotally mounted on a shaft at right angles to the two paths aforesaid and is subjected to the action of elastic means for returning against a stop, said catch being provided on the one hand with a hook-shaped portion which describes a portion of circumference tangent to the first path aforesaid during the pivotal motion of said catch and is capable of preventing the displacement of the lever from its neutral position in the direction of the second path aforesaid when said catch is applied against said stop whereas said catch permits said displacement after having pivoted under the action of the manual-control lever which has been brought to the work position thereof and, on the other hand, with a portion in the form of a cam against which the manual control lever is applied in its movement along the second path aforesaid in the direction of its return to the neutral position thereof so as to cause said catch to pivot in opposition to its elastic restoring means.

* * * * *